US008528109B2

(12) United States Patent
Asipov et al.

(10) Patent No.: US 8,528,109 B2
(45) Date of Patent: Sep. 3, 2013

(54) OPTIMIZING AMOUNT OF DATA PASSED DURING SOFTWARE LICENSE ACTIVATION

(75) Inventors: Boris Asipov, Bellevue, WA (US); Aidan Thomas Joseph Hughes, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1091 days.

(21) Appl. No.: 11/869,742

(22) Filed: Oct. 9, 2007

(65) Prior Publication Data
US 2009/0092253 A1 Apr. 9, 2009

(51) Int. Cl.
*G06F 21/00* (2006.01)

(52) U.S. Cl.
USPC .................. 726/33; 726/2; 380/277; 713/155

(58) Field of Classification Search
None
See application file for complete search history.

(56) References Cited

U.S. PATENT DOCUMENTS

| | | | | |
|---|---|---|---|---|
| 4,937,863 A * | 6/1990 | Robert et al. | ................. | 710/200 |
| 5,222,134 A | 6/1993 | Waite et al. | | |
| 5,559,505 A * | 9/1996 | McNair | ........................ | 340/5.28 |
| 6,993,664 B2 | 1/2006 | Padole et al. | | |
| 7,406,600 B2 * | 7/2008 | Thomas et al. | ............... | 713/181 |
| 8,351,608 B2 * | 1/2013 | Kobayashi | .................... | 380/277 |
| 2001/0044782 A1 * | 11/2001 | Hughes et al. | .................. | 705/59 |
| 2002/0010863 A1 * | 1/2002 | Mankefors | ..................... | 713/189 |
| 2002/0120726 A1 * | 8/2002 | Padole et al. | .................. | 709/222 |
| 2004/0128395 A1 * | 7/2004 | Miyazaki | ....................... | 709/229 |
| 2004/0133792 A1 * | 7/2004 | Dublish et al. | ................ | 713/193 |
| 2004/0177354 A1 * | 9/2004 | Gunyakti et al. | .............. | 717/174 |
| 2004/0260589 A1 | 12/2004 | Varadarajan et al. | | |
| 2005/0005098 A1 * | 1/2005 | Michaelis et al. | ............ | 713/156 |
| 2005/0071281 A1 | 3/2005 | Faur et al. | | |
| 2005/0086501 A1 * | 4/2005 | Woo et al. | ...................... | 713/189 |
| 2005/0114265 A1 * | 5/2005 | Satkunanathan et al. | ........ | 705/59 |

(Continued)

OTHER PUBLICATIONS

"Technical Details on Microsoft Product Activation for Windows XP", Microsoft Technet, Aug. 2001, pp. 1-7, accessed via http://microsoft.technet.com on Oct. 16, 2011.*

(Continued)

*Primary Examiner* — Jeffery Williams
(74) *Attorney, Agent, or Firm* — Chin IP, PLLC; David Chin (57) ABSTRACT

During a software activation process, a processing device may provide a software license key to be communicated to an activation authority. The software license key may be provided to the activation authority via one of a number of communication methods, such as, for example, via a telephone, via a facsimile, via e-mail, via a text message, or via other communication methods. A length of the software license key may be based on an expected amount of time to provide the software license key to the activation authority. When the expected amount of time is relatively long, the software license key may be relatively short. When the expected amount of time is relatively short, the software license key may be relatively long. In some embodiments, a relatively short software license key may be a unique subset of a relatively long software license key.

14 Claims, 6 Drawing Sheets

(56) References Cited

U.S. PATENT DOCUMENTS

| | | |
|---|---|---|
| 2005/0114266 A1* | 5/2005 | Satkunanathan et al. ....... 705/59 |
| 2005/0256805 A1* | 11/2005 | Satkunanathan et al. ....... 705/59 |
| 2005/0289072 A1 | 12/2005 | Sabharwal |
| 2006/0015466 A1 | 1/2006 | Noioso et al. |
| 2006/0106728 A1 | 5/2006 | Yellai et al. |
| 2006/0122939 A1* | 6/2006 | Cohen et al. .................... 705/59 |
| 2006/0143473 A1* | 6/2006 | Kumar .......................... 713/189 |
| 2006/0179002 A1* | 8/2006 | Brooks et al. .................. 705/59 |
| 2006/0212363 A1* | 9/2006 | Peinado et al. ................. 705/26 |
| 2007/0078957 A1 | 4/2007 | Ypya et al. |
| 2008/0189549 A1* | 8/2008 | Hughes ......................... 713/171 |
| 2008/0301447 A1* | 12/2008 | Hughes et al. ................ 713/176 |

OTHER PUBLICATIONS

"How to Optimize Novell Licensing Services", retrieved on Jul. 16, 2007 at <<http://support.novell.com/techcenter/articles/ana20010102.html>>, pp. 1-32.

"QuickLicense 2.0—Software License Protection and Management", retrieved on Jul. 16, 2007 at http://www.sanepr.com/QuickLicense-2-0-Software-License-Protection-and-Management_14014.cfm>>, pp. 1-2.

"Agilent 3070 Software License Activation", Agilent Technologies, pp. 1-5.

* cited by examiner

OPTIMIZING AMOUNT OF DATA PASSED DURING SOFTWARE LICENSE ACTIVATION

BACKGROUND

A software activation process may be performed on a processing device in order to enable functionality of a software application to be executed on the processing device. During the software activation process, the processing device may generate binding information, which may indicate one or more characteristics of the processing device. The processing device may prompt a user to enter a product code, with respect to a product including the software application. After receiving the product code, the processing device may provide a software license key, associated with the software application, along with the binding information, which may be passed to an authorization authority, such as, for example, a server. In response to receiving the software license key and the binding information, the authorization authority may provide an authorization code for the processing device. After receiving the authorization code, the processing device may unlock or enable the functionality of the software application. Exchange of the software license key, the binding information, and the authorization code between the processing device and the authorization authority may occur over different media, such as, for example, a telephone, the Internet, or other media. Regardless of which media is used, the software license key provided to the authorization authority remains unchanged.

Typically, the software license key may be long for security reasons. When the software license key is to be passed via some media, such as, for example, the telephone, or other media, the user may manually provide the software license key. Manually providing a long software license key may be a tedious and error prone process.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a processing device may provide a software license key in response to receiving a product key identifying a product. A length of the provided software license key may vary based on a communication method used to communicate the software license key to an activation authority. For example, a software activation operation, which may include providing the software license key to an activation authority via a selected one of a number of communication methods, may take a relatively short amount of time, or a relatively long amount of time, based on the selected one of the number of communication methods used. When the software activation operation is expected to take a relatively short amount of time, a relatively long software license key may be provided by the processing device. When the software activation operation is expected to take a relatively long amount of time, a relatively short software license key may be provided by the processing device. In one embodiment, a relatively short software license key may be a unique subset of a relatively long software license key.

In embodiments consistent with the subject matter of this disclosure, an activation code provided by an activation authority, in response to receiving a software license key, may include a second key for decrypting encrypted license data residing on the processing device. The license data may further include a third key for decrypting encrypted application code of a software application residing on the processing device. In some cases, the activation code may include digitally signed licensed data, which may include information with respect to one or more license terms.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

In order to provide adequate security, a length of a key, such as, for example, a software license key, may be based on a length of time needed to perform an operation. For example, a software activation operation, which may include providing the software license key from a processing device, connected to a network, to an activation authority, connected to the network, may take a small amount of time. In such a situation, the software license key may have a relatively long length. However, when the software activation operation includes providing the software license key through a communication method, such as, for example, a telephone, a facsimile, an instant message, or other communication method, the software activation operation may take a much longer period of time. As a result, in such a situation, a relatively short software license key may provide an adequate level of security. Thus, in embodiments consistent with the subject matter of this disclosure, a length of the software license key may be based on a communication method used to provide the software license key to an authorization authority.

Exemplary Operating Environment

Figure 1:
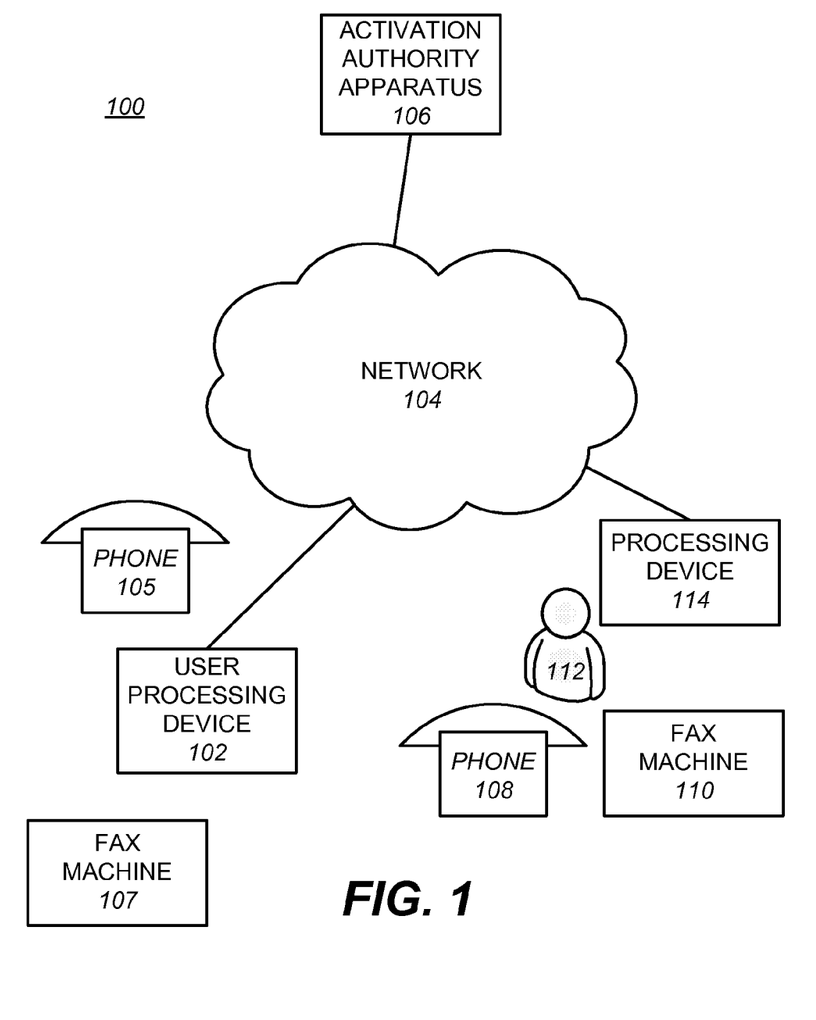
FIG. 1 illustrates an exemplary operating environment for embodiments consistent with the subject matter of this disclosure.

FIG. 1 illustrates an exemplary operating environment 100 for embodiments consistent with the subject matter of this disclosure. Operating environment 100 may include a user processing device 102, a network 104, an activation authority apparatus 106, telephones 105, 108, fax machines 107, 110, a licensing agent 112, and a processing device 114.

Network 104 may be a single network or a combination of networks, such as, for example, the Internet or other networks. Network 104 may include a wireless network, a wired network, a packet-switching network, a public switched telecommunications network, a fiber-optic network, other types of networks, or any combination of the above.

User processing device 102 and processing device 114 may be, for example, a desktop personal computer (PC), a laptop PC, a handheld processing device, or other processing device connected to network 104 via a wired or wireless interface.

Telephones 105, 108 and fax machines 107, 110 may be used by a user of user processing device 102 to communicate a software license key to a licensing agent 112.

Activation authority apparatus 106 may be a processing device or a group of processing devices configured to work together. In embodiments in which activation authority apparatus 106 includes a group of servers, the servers may be configured as a server farm.

Exemplary Processing Device

Figure 2:
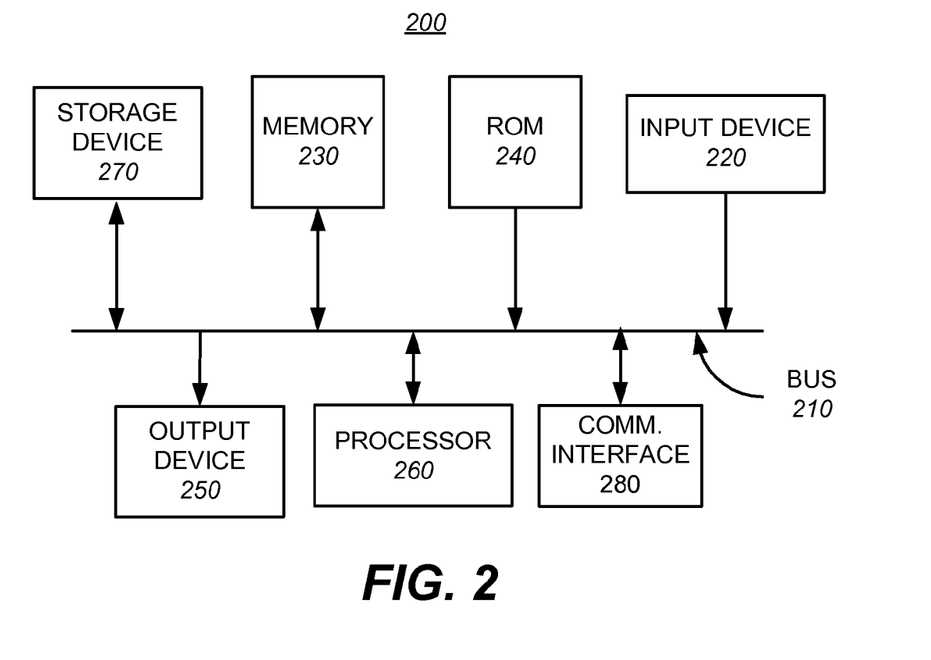
FIG. 2 is a functional block diagram of a processing device, which may be used to implement an activation authority apparatus or a processing device shown in FIG. 1.

FIG. 2 is a functional block diagram that illustrates an exemplary processing device 200, which may be used to implement embodiments of user processing device 102, processing device 114 and/or activation authority apparatus 106 consistent with the subject matter of this disclosure.

Processing device 200 may include a bus 210, an input device 220, a memory 230, a read only memory (ROM) 240, an output device 250, a processor 260, a storage device 270, and a communication interface 280. Bus 210 may permit communication among components of processing device 200.

Processor 260 may include at least one conventional processor or microprocessor that interprets and executes instructions. Memory 230 may be a random access memory (RAM) or another type of dynamic storage device that stores information and instructions for execution by processor 260. Memory 230 may also store temporary variables or other intermediate information used during execution of instructions by processor 260. ROM 240 may include a conventional ROM device or another type of static storage device that stores static information and instructions for processor 260. Storage device 270 may store data and/or instructions for a processor, such as, for example, processor 260.

Input device 220 may include a keyboard or other input device. Output device 250 may include one or more conventional mechanisms that output information, including one or more display screens, or other output devices.

Communication interface 280 may include a transceiver for transmitting and receiving information to or from network 104. Communication interface 280 may transmit and receive information via a wireless or wired connection.

Processing device 200 may perform such functions in response to processor 260 executing sequences of instructions contained in a tangible machine-readable medium, such as, for example, memory 230, ROM 240, storage device 270, or other medium. Such instructions may be read into memory 230 from another machine-readable medium or from a separate device via communication interface 280.

Exemplary Processing

Figure 3:
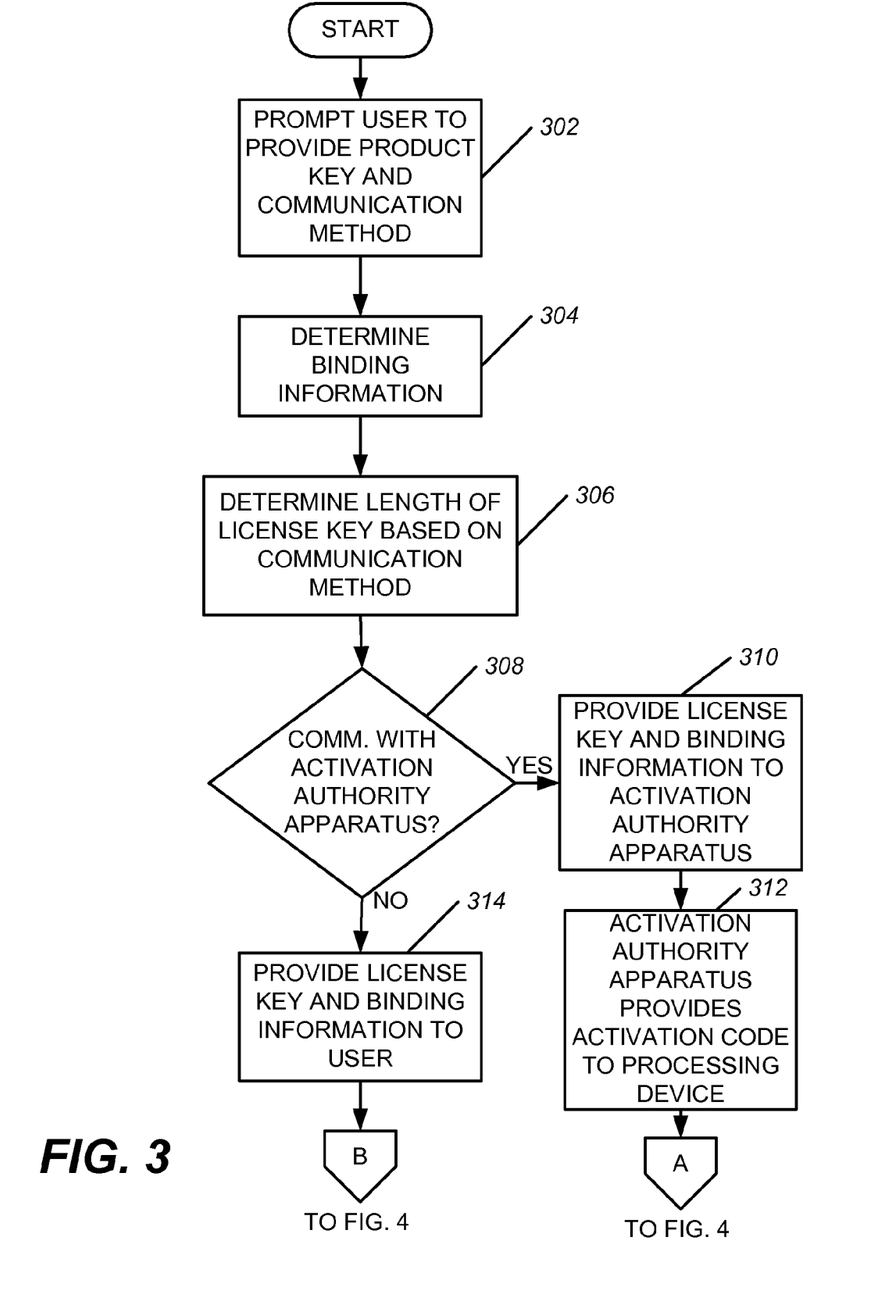
FIGS. 3 and 4 are flowcharts illustrating an exemplary software activation process, which may be performed in embodiments consistent with the subject matter of this disclosure.
Figure 4:
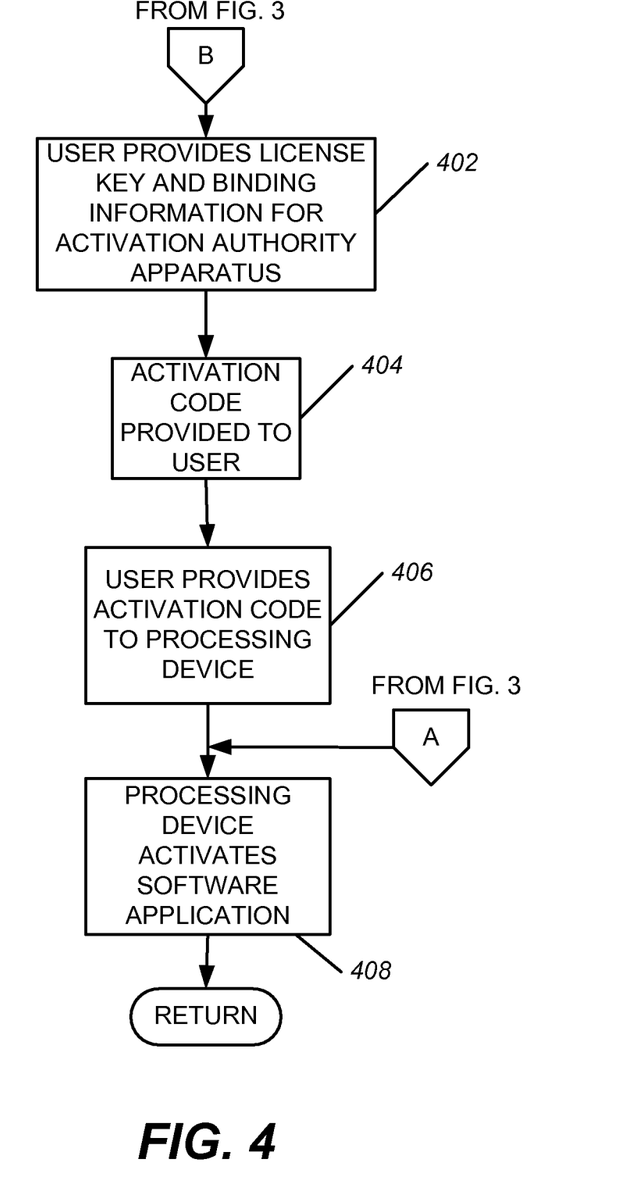

FIGS. 3-4 are flowcharts which illustrate an exemplary process, which may be implemented in embodiments consistent with the subject matter of this disclosure. The process may begin with user processing device 102 executing a software application activation process and prompting a user to provide a product key and a communication method the user intends to use to communicate the product key to activation authority apparatus 106 (act 302).

Figure 5:
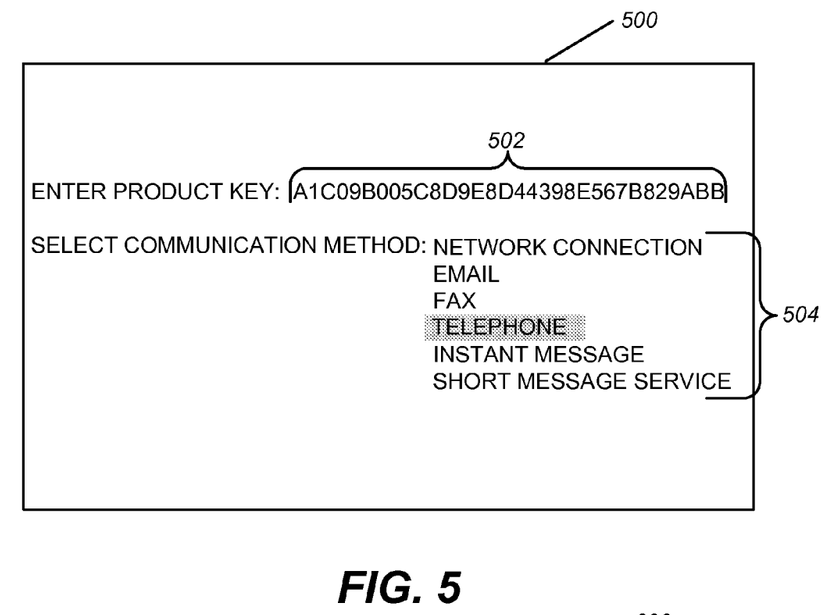
FIGS. 5 and 6 illustrate exemplary display screens showing exemplary user interfaces, which may be implemented in embodiments consistent with the subject matter of this disclosure.

FIG. 5 illustrates an exemplary user interface 500 prompting the user to provide the product key and an indication of the communication method for providing a software license key to activation authority apparatus 106. User interface 500 may prompt the user to enter a product key 502. Product key 502 may include letters, numbers, as well as other characters. User interface 500 may further prompt the user to select one of a number of communication methods 504 for providing a software license key to activation authority apparatus 106. In exemplary user interface 500, the user may select one of: network connection (corresponding to a direct network connection between user processing device 102 and activation authority apparatus 106), email, telephone, instant message (IM), and short message service (SMS). In other embodiments, different, additional, or other communication methods may be selected. Exemplary user interface 500 illustrates communication method, telephone, being highlighted as a result of a user selection. The selection may be made via a pointing device, such as, a computer mouse, or other device. In some embodiments, a menu of communication methods may be presented as a pop-up menu, or may be presented via other techniques.

Returning to the flowchart of FIG. 3, user processing device 102 may determine binding information (act 304). The binding information may indicate one or more characteristics of user processing device 102. For example, the binding information may indicate a type of processor, an amount of memory, an amount of storage space, or other characteristics of user processing device 102. The binding information may serve as an identifier of user processing device 102.

Next, user processing device 102 may determine a length of a software license key based on a characteristic of the selected communication method for communicating the software license key to activation authority apparatus 106, as indicated during act 302 (act 306). For example, user processing device 102 may determine that the length of the software license key is relatively short when a communication method requiring a relatively long time period for communicating the software license key to activation authority apparatus 106 is indicated. User processing device 102 may determine that the length of the software license key is relatively long when a communication method requiring a relatively short time period for communicating the software license key to activation authority apparatus 106 is indicated. As an example, when the software license key is to be communicated to activation authority apparatus 106 directly from the software activation process executing on user processing device 102 via network 104, the software license key may be relatively long because an operation of providing the software license key via the communication method may take a relatively short time period. When the software license key is to be communicated to activation authority apparatus 106 via, for example, telephone or e-mail, the software license key may be relatively short because the operation of providing the software license key via these communication methods may take a relatively long time period. In some embodiments, different length software license keys for a particular product may be a subset of a long software license key. Each of the different length software license keys may be unique.

User processing device 102 may then determine whether the selected communication method includes communicating directly with the activation authority apparatus via network 104 (act 308). If user processing device 102 determines that the selected communication method includes communicating directly with activation authority apparatus 106 via network 104, then user processing device 102 may provide the software license key and the binding information to activation authority apparatus 106 via at least one message sent through network 104 (act 310). After receiving the software license key and the binding information, activation authority apparatus 106 may associate user processing device 102 with the software license key by storing the binding information such that the binding information is associated with a software license corresponding to the software license key. Activation authority apparatus 106 may then obtain an activation code and may provide the activation code to user processing device 102 via at least one message sent to user processing device 102 over network 104 (act 312).

Figure 6:
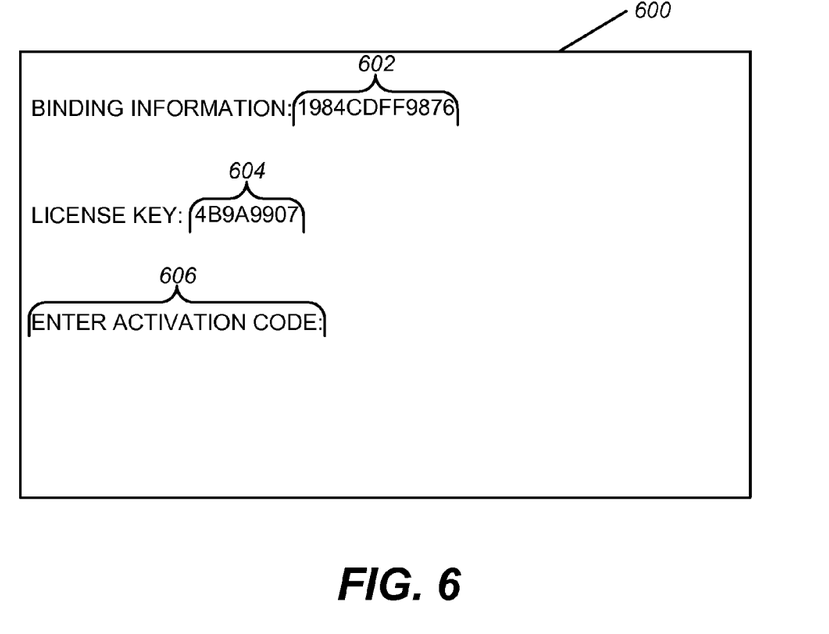

If, during act 308, user processing device 102 determines that the selected communication method includes a method other than communicating directly with activation authority apparatus 106 via network 104, then user processing device 102 may provide the software license key and the binding information to the user via a user interface (act 314). FIG. 6 illustrates an exemplary user interface 600 for providing binding information 602 and software license key 604. Exemplary user interface 600 may further prompt the user to provide an activation code, which may be provided by activation authority apparatus 106, as will be explained below.

Next, the user may provide the software license key and the binding information via the selected communication method (act 402; FIG. 4). For example, if the selected communication method is via telephone, the user may call a specific phone number using telephone 105. The telephone may be answered by licensing agent 112 via telephone 108. The user may then provide licensing agent 112 with the software license key and the binding information. Licensing agent 112 may then provide a software license key and the binding information to activation authority apparatus 106 via processing device 114 and network 104. Alternatively, when the user calls the specific phone number using telephone 105, processing device 114 may answer the call and may receive the software license key and the binding information entered via a keypad of telephone 105, or may receive the software license key and the binding information as speech input and may convert to speech input to textual data to be provided to activation authority apparatus 106 via network 104.

As another example, the user may select "fax" as a communication method for providing the software license information and the binding information to activation authority apparatus 106. The user may provide the software license key and the binding information by sending a facsimile to be received by licensing agent 112, who may then provide the software license key and the binding information to activation authority apparatus 106 via processing device 114 and network 104. Alternatively, the facsimile, including the software license key and the binding information, may be received by a process executing on processing device 114, which may convert the received software license key and the binding information included in the facsimile to text, and may send data indicative of the license key and the binding information to activation authority apparatus 106 via network 104.

After activation authority apparatus 106 receives the software license key and the binding information, activation authority apparatus 106 may provide an activation code to the user (act 404). If the user uses email as a communication method for providing a software license key and the binding information to activation authority apparatus 106, then activation authorization apparatus 106 may return the activation code to the user via email. Similarly, if the user uses facsimile as a communication method for providing a software license key and the binding information to activation authority apparatus 106, then activation authority apparatus 106 may return the activation code to the user via facsimile. In one embodiment, activation authority apparatus 106 may send the activation code via telephone or facsimile to licensing agent 112, who may provide the activation code to the user via a communication method.

The user may provide the activation code to user processing device 102 via a user interface (act 406). For example, exemplary user interface 600 may prompt the user to provide the activation code via prompt 606. The activation code may include license data for the software application. The license data may be digitally signed and may further include one or more license terms, such as, for example, a license expiration date, a fixed time period for the license (1 year, 18 months, or another time period), and/or other license terms.

In some embodiments, instead of including license data, the activation code may include a key for decrypting encrypted license data, which may be previously stored on a component of user processing device 102, such as memory 230, storage device 270, or another component. The license data may further include a second key for decrypting encrypted code of the software application, which may have been previously stored on a component of user processing device 102.

After the activation code is provided via act 406, or act 312, user processing device 102 may activate a software application associated with the activation code (act 408). In an embodiment in which the activation code includes digitally-signed license data, activation may include validating the license data and storing the license data on a component of user processing device 102. In an embodiment in which the application code includes a key for decrypting previously stored license data on a component of user processing device 102, user processing device 102 may decrypt the license data, which may be digitally signed, and may further validate the license data. If the license data further includes a second key for decrypting previously stored encrypted application code on a component of user processing device 102, then user processing device 102 may decrypt the previously stored encrypted application code.

The process described by FIGS. 3 and 4 is only exemplary. Embodiments consistent with the subject matter of this disclosure may include additional acts, or different acts and/or may perform the acts in a different order.

Figure 7:
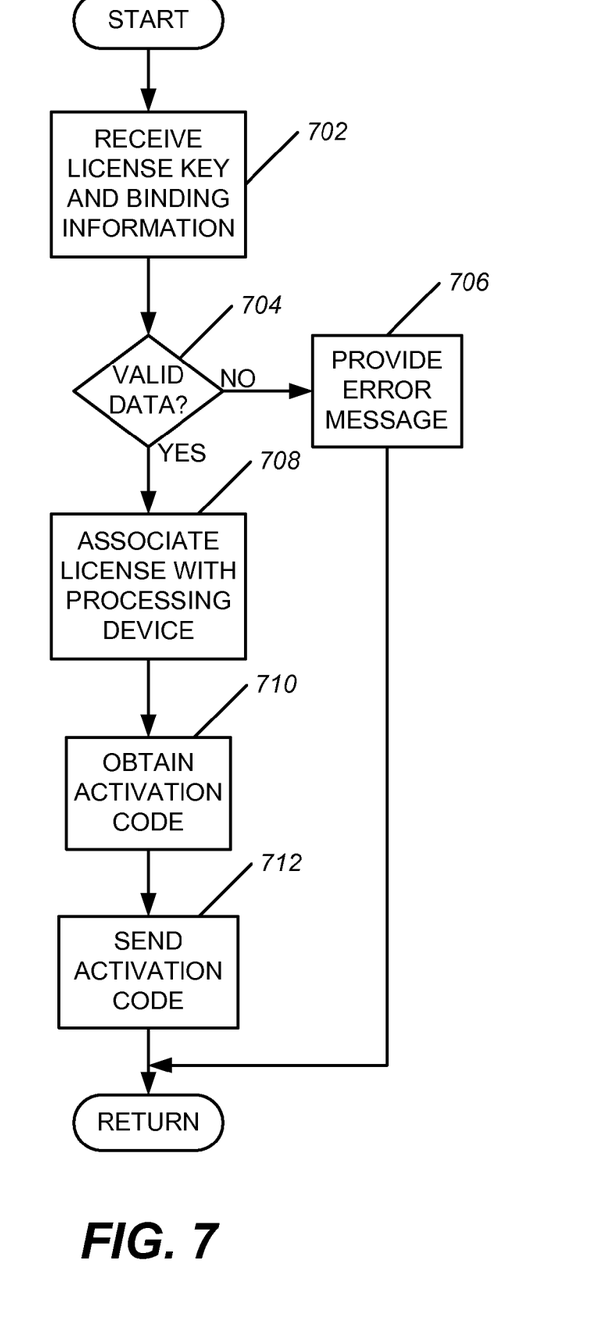
FIG. 7 is a flowchart illustrating an exemplary process, which may be performed in an activation authority apparatus consistent with the subject matter of this disclosure.

FIG. 7 is a flowchart illustrating an exemplary process, which may be performed by activation authority apparatus 106 in an embodiment consistent with the subject matter of this disclosure. The process may begin with activation authority apparatus 106 receiving a license key and binding information, as may be provided by acts 310 (FIG. 3) or 402 (FIG. 4). Activation authority apparatus 106 may then determine whether the license key and the binding information include valid data (act 704). If activation authority apparatus 106 determines that either the license key or the binding information do not include valid data, then activation authority apparatus 106 may provide an error message (act 706). If the license key and the binding information were provided to activation authority apparatus 106 directly through a network, such as, network 104, then the error message may be provided directly to user processing device 102 via network 104. If the license key and the binding information were provided by licensing agent 112, then activation authority apparatus 106 may provide the error message to licensing agent 112 through processing device 114, who may then provide the error message to the user via a selected one of communication methods.

If, during act 704, activation authority apparatus 106 determines that the license key and the binding information include valid data, then activation authority apparatus 106 may associate a license, corresponding to the license key, with the binding information, corresponding to user processing device 102 (act 708). In one embodiment, activation authority apparatus 106 may associate information with respect to the license and information with respect to the processing device and may store the information with respect to the license, the information with respect to the processing device, and information with respect to the association in a database.

Activation authority apparatus 106 may then obtain an activation code with respect to the license (act 710). As previously described, the activation code may include license data, having data with respect to one or more license terms, the activation code may include a key for decrypting encrypted license data previously stored on a component of user processing device 102, or the activation code may include a key for decrypting encrypted license data previously stored on a component of user processing device 102, and the license data may further include a second key for decrypting encrypted application code previously stored on a component of user processing device 102. In other embodiments, the activation code may include other data and/or other keys for obtaining or decrypting other information.

Activation authority apparatus 106 may then send the activation code (act 712). When user processing device 102 provides the license key and the binding information to activation authority apparatus 106 directly through network 104, activation authority apparatus 106 may send the activation code to user processing device 102 via network 104. When licensing agent 112 provides the license key and the binding information to activation authority apparatus 106 through processing device 114, activation authority apparatus 106 may send the activation code to processing device 114. Licensing agent 112 may then view the activation code and may send the activation code to the user via a same means used by the user to provide the license key and the binding information to licensing agent 112. In another embodiment, processing device 114 may receive the activation code from activation authority apparatus 106 and may automatically send the activation code to user processing device 102 using a same communication method which user processing device 102 employed to provide the license key and the binding information to either licensing agent 112 or processing device 114. That is, processing device 114 may receive the activation code and may automatically send the activation code to user processing device 102 via email, IM, facsimile, SMS, or other communication method.

The process described by FIG. 7 is only exemplary. Embodiments consistent with the subject matter of this disclosure may include additional acts, or different acts and/or may perform the acts in a different order.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents define the invention, rather than any specific examples given.

We claim as our invention:

1. A method for optimizing an amount of data passed during a software activation process, the method comprising:

providing, to a processing device, an indication of one of a plurality of communication methods intended for use in communicating with an activation authority apparatus, the one of the plurality of communication methods being either a telephone or a facsimile communication;

determining, by the processing device, a length of a license key associated with a software application, the length being based on the indicated one of the plurality of communication methods;

providing the license key and binding information, separate from the license key, to the activation authority apparatus to associate the processing device with a software license corresponding to the license key, the license key and the binding information being provided via the indicated one of the plurality of communication methods, the binding information indicating at least one characteristic of the processing device; and receiving, by the processing device after the providing the license key and binding information, an activation code provided by the activation authority apparatus for activating the software application on the processing device, wherein:

when the indication of the one of the plurality of communication methods for use in communicating with the activation authority apparatus indicates the telephone as the one of the plurality of communication methods, the method further comprises:

calling a specific phone number to a second processing device that answers a call to the specific phone number, and providing the license key and the binding information to the second processing device, the license key and the binding information being input by a user via a keypad of the telephone or as speech input via the telephone, the second processing device being arranged to receive the license key and the binding information and provide the license key and the binding information to the activation authority apparatus; and when the indication of the one of the plurality of communication methods for use in communicating with the activation authority apparatus indicates the facsimile communication as the one of the plurality of communication methods, the method further comprises providing, to a third processing device, the license key and the binding information via the facsimile communication, the third processing device being arranged to convert the license key and the binding information to text and send the license key and the binding information to the activation authority apparatus via a network.

2. The method of claim 1, wherein the determining a length of a license key further comprises
  determining the length of the license key based on an expected amount of time to perform an operation for providing the license key via the indicated one of the plurality of communication methods.

3. The method of claim 1, wherein
  the determined length of the license key for the indicated one of the plurality of communication methods is shorter than a determined length of the license key for a second communication method that is expected to be faster than the indicated one of the plurality of communication methods.

4. The method of claim 3, wherein the license key for the indicated one of the plurality of communication methods is a unique subset of a longer license key.

5. The method of claim 1, wherein:
  the activation code comprises digitally signed license data including at least one license term, and
  the method further comprises validating, by the processing device, the digitally signed license data.

6. The method of claim 1, wherein:
  the activation code comprises a second key for decrypting encrypted license data residing in a component of the processing device, and
  the method further comprises using the second key to decrypt the encrypted license data.

7. The method of claim 1, wherein:
  the activation code comprises a second key for decrypting encrypted license data residing in a component of the processing device,
  the license data comprises a third key for decrypting encrypted application code of the software application residing in the component of the processing device, and
  the method further comprises:
    using the second key to decrypt the encrypted license data; and
    using the third key to decrypt the encrypted application code of the software application.

8. A machine-readable memory device having instructions for at least one processor of a processing device, such that when the at least one processor executes the instructions, the at least one processor performs a method comprising:
  providing a user interface for a user to provide a product key, identifying a product, and an indication of a communication method for providing, to an activation authority, a license key corresponding to a software license associated with a software application, the indicated communication method being either a telephone or a facsimile communication;
  determining a length of the license key based on the indicated communication method;
  providing the license key and separate binding information to the activation authority to associate the processing device with the software license corresponding to the license key, the license key and the separate binding information being provided to the activation authority via the indicated communication method, the separate binding information indicating at least one characteristic of the processing device;
  receiving an activation code, provided by the activation authority, in response to the providing of the license key and the separate binding information, and
  using the activation code to activate the software application, wherein:
  when the indicated communication method is the telephone, the method further comprises:
    calling a specific phone number to a second processing device that answers a call to the specific phone number, and
    providing the license key and the separate binding information to the second processing device, the license key and the separate binding information being input by a user via a keypad of the telephone or as speech input via the telephone, the second processing device being arranged to receive the license key and the separate binding information and provide the license key and the separate binding information to the activation authority; and
  when the indicated communication method is the facsimile communication, the method further comprises:
    providing the license key and the separate binding information to a third processing device via the facsimile communication method, the third processing device being arranged to convert the license key and the separate binding information, included in the facsimile communication, to text and provide the license key and the separate binding information to the activation authority.

9. The machine-readable memory device of claim 8, wherein the determining a length of the license key based on the indicated communication method further comprises:
  determining a length of the license key based on an expected amount of time to perform an operation for providing the license key to the activation authority via the indicated communication method.

10. The machine-readable memory device of claim 8, wherein the providing the license key and the separate binding information further comprises:
  providing a unique subset of a longer license key as the license key.

11. The machine-readable memory device of claim 8, wherein:
  the activation code includes digitally signed license data; and
  the method further comprises validating the digitally signed license data.

12. The machine-readable memory device of claim 8, wherein the method further comprises:
  receiving a second key, included in the activation code, for decrypting previously-stored encrypted license data, and
  the using the activation code to activate the software application further comprises:
    using the second key for decrypting the previously-stored encrypted license data to produce unencrypted license data.

13. The machine-readable memory device of claim 8, wherein the method further comprises:
  receiving a second key, included in the activation code, for decrypting previously-stored encrypted license data, and
  the using the activation code to activate the software application further comprises:
    using the second key to decrypt the previously-stored encrypted license data to produce unencrypted license data,
    obtaining a third key included in the unencrypted license data, and
    using the third key to decrypt encrypted application code of the software application.

14. The machine-readable memory device of claim 8, wherein the binding information indicates one or more of:
   a type of processor,
   an amount of memory; and
   an amount of storage space.

\* \* \* \* \*